April 14, 1964   J. R. R. HARTER   3,129,403
AUTOMATIC MARINE BEACON
Filed Sept. 2, 1959   2 Sheets-Sheet 1

INVENTOR.
James R. R. Harter
BY Karl Huber Attorney

INVENTOR.
James R. R. Harter
BY Karl Kuhn Attorney

United States Patent Office 3,129,403
Patented Apr. 14, 1964

3,129,403
AUTOMATIC MARINE BEACON
James R. R. Harter, 4953 Brandywine St. NW.,
Washington, D.C.
Filed Sept. 2, 1959, Ser. No. 837,684
4 Claims. (Cl. 340—12)

This invention relates to an automatic marine beacon and more particularly with a beacon which, when immersed in water, emits signals and thereby facilitates locating sunken objects.

In accordance with the invention, such a device preferably forms part of and is mounted within a buoy attached to the object, e.g., a vessel. The device comprises a housing of plastic, metal or other practical structural material containing the dry components of a voltaic battery, the housing having several water soluble seals mounted in the walls thereof in order to retard the penetration of water into the housing for a predetermined period of time. When this occurs, the voltaic battery starts generating a current which is used for energizing an acoustical signal device. The invention provides, furthermore, such a signal device which consists of a set of electrodes mounted within an open, water-filled cavity in the housing, a pair of control electrodes and a spark gap in the cavity. The electric energy generated by the battery is used to electrically decompose the water content of the cavity and to produce a spark across a gap when the gas mixture of hydrogen and oxygen generated in the ratio of 2 to 1 reaches a predetermined volume determined by the location of the control electrodes. After explosion, the cavity is filled again under the pressure of the surrounding water, since the gas mixture, when ignited, reacts to form water and the cycle of decompositions followed by explosions repeats itself continuously until the battery is exhausted. It will be apparent that by the means described, an extremely intense acoustical signal consisting of intermittently occuring explosions will be emitted from the sunken object whereby the energy used to produce it is comparatively low. Explosions, furthermore, are especially suited for the purpose, since they cover a large range of wave lengths in the acoustical spectrum which increases the probability of good transmission into all directions and under even adverse circumstances at any depth.

Figure 1:
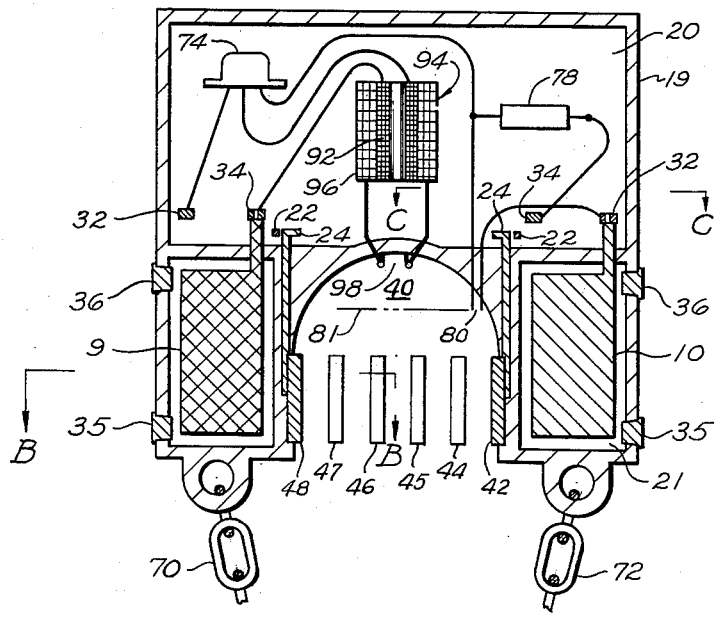
Figure 2:
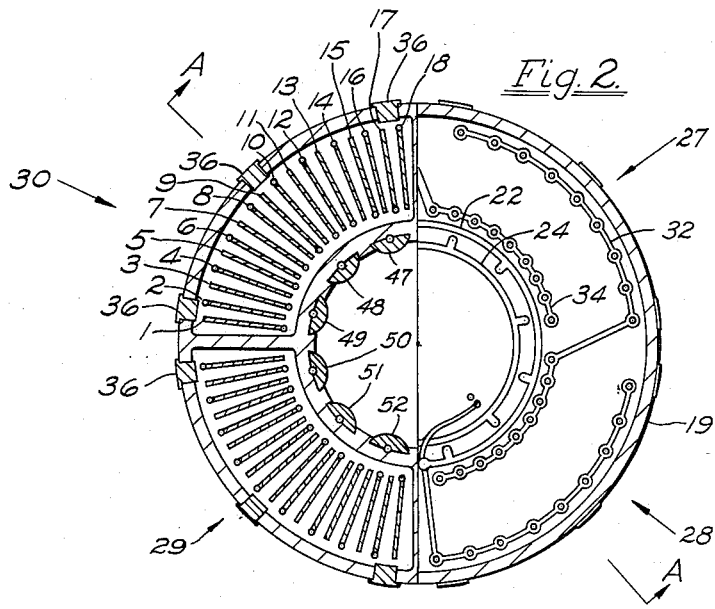
Figure 3:
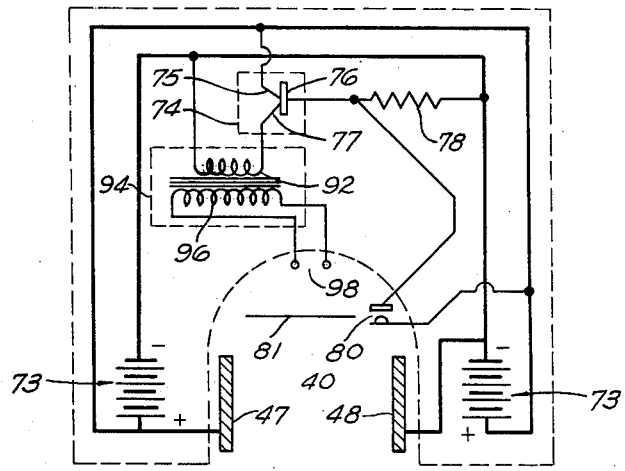
Figure 4:
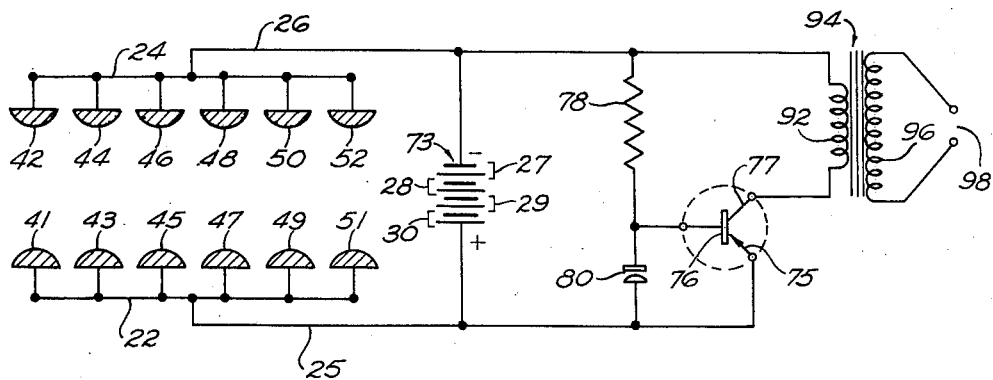

The invention will be further illustrated by reference to the accompanying drawing in which:

FIGURE 1 is a schematic sectional view of an automatic marine beacon taken along the line A—A of FIGURE 2, FIGURE 2 is a cross-sectional view along the lines B—B and C—C of FIGURE 1, FIGURE 3 is a schematic electrical diagram of an electrical circuit of the invention, and FIGURE 4 illustrates a modified schematic electrical system.

Referring to FIGURES 1 and 2, the automatic marine beacon represents a sealed housing 19, which is preferably composed of two portions 20 and 21, the portion 20 forming an air filled cavity to supply the buoyancy condition, whereas the annular portion 21 contains the dry components of a voltaic battery, i.e. a set of spaced electrodes connected to form two groups, each groups consisting of a different material than the other group. As an example, the battery is composed of four cells 27, 28, 29, 30. Each cell is identical and may be constituted of nine silver chloride plates, 2, 4, 6, 8, 10, 12, 14, 16 and 18 whereas nine cuprous chloride plates, 1, 3, 5, 7, 9, 11, 13, 15 and 17, form the other group. However, any other suitable combination of electrode material can be used which will cooperate to constitute a voltaic battery when in contact with sea water and, in addition, the housing portion 21 can contain a quantity of a dry salt, such as sodium chloride in order to form a voltaic battery delivering a stronger current. The electrodes 2, 4, 6, 8, 10, 12, 14, 16 and 18 are connected to each other by a line 32 and the electrodes 1, 3, 5, 7, 9, 11, 13, 15 and 17 are similarly connected to each other by another line 34. In order to protect the entire battery assembly when stocked and not in use or under normal operating conditions against humidity, the housing portion 21 is hermetically sealed by a plurality of upper and lower plugs 36 and 35 made from any suitable water soluble material. Good results are obtained with plugs of gelatin, but any other water soluble material can be used, such as compressed salts, for example sodium chloride. Upon immersion of the entire device, which occurs when it is attached to a sinking ship or aircraft for example, the plugs start dissolving until water penetrates into the housing portion 21, whereby the dimensions of the plugs 35 and 36 retard the access of water to the dry battery components contained in the housing. This may be regulated for a certain predetermined interval of time from the moment of immersion until the actual entry of water.

Only then the battery starts generating an electrical current, which can be used in any desired way to produce an acoustical signal. However, it has been found that, in accordance with the invention, an extremely efficient means to transform the electrical energy into sound signals consists of decomposing a quantity of the surrounding sea water in a cavity of the housing provided therefor and collecting the decomposition product which is a mixture of hydrogen and oxygen in the ratio of 2 to 1 and, finally, ignite the mixture, whereby the explosion produced constitutes an extremely intense signal which is intermittently emitted as set forth hereinbefore.

In order to achieve the effect described above, the housing 19 forms a cavity 40 open toward the bottom thereof, e.g., the bottom wall of the housing is recessed to form the cavity. A set of electrodes made from or coated with a noncorrosive material, e.g. precious metal, is mounted along the wall of the cavity. If metal is used to fabricate the housing, these electrodes must be insulated therefrom as well as all other electrical connections within spaces 20 and 21. These electrodes are connected into a circuit as illustrated by FIGURE 4 which circuit is energized by the battery, such that half the number of electrodes 41, 43, 45, 47, 49 and 51 perform as anodes while the remaining electrodes 42, 44, 46, 48, 50, and 52 are connected as the cathodes.

As shown in FIGURES 1 through 4, the anode plates 41, 43, 45, 47, 49 and 51 are connected to each other by bus bar 22 which is connected to the positive battery terminal by bus bar 25, whereas electrodes 42, 44, 46, 48, 50 and 52 are connected to each other by bus bar 24 which is in turn connected to the negative battery terminal by bus bar 26. The battery is composed of four (4) cells 27, 28, 29 and 30. Each cell is composad of nine (9) positive plates 2, 4, 6, 8, 10, 12, 14, 16 and 18 and nine (9) negative plates 1, 3, 5, 7, 9, 11, 13, 15 and 17. The positive plates of each cell are all connected to a common bus bar 32, and the negative plates are connected together by bus bar 34. The four cells are series connected by three bus bars numbered 25. The resulting battery has a relatively high ampere hour capacity and the proper terminal voltage for the electrolysis function.

The detailed function of the total automatic beacon depicted by FIGURES 1, 2 and 3 is as follows:

When the unit is immersed in sea water, it sinks until the anchor, weight or other heavy object to which it is attached by chains 70 and 72 or other attachment devices, until the anchor or weight reaches the bottom. The beacon unit floats upright, with the part of the housing indicated as 20, uppermost. In the course of submersion sea water has filled cavity 40 and after a reasonable length of time, upper and lower water soluble plugs 36 and 35, have dissolved. The bottom holes 35a into the housing compartment numbered 21 permit sea water to enter. The upper holes 36a permit air, or such dry gas as may have been used to maintain the battery materials inactive during storage, to pass out, as well as permitting sea water to enter.

The battery is activated as soon as the sea water has filled the cell chambers or compartments due to the ion exchange reaction between the cuprous chloride cathodes, the sea water and the magnesium silver chloride anodes. The potential difference thus developed is impressed across the anodes and cathodes in the open bottomed sea water-flooded chamber designated as 40 in FIGURES 1, 2, 3 and 4. Here again there is an electrolytic action which in this case serves primarily to decompose the sea water into its principal parts hydrogen gas, 2 parts for every one part of oxygen gas released. Various other materials in the sea water, NaCl, $MgSO_4$, $MgCl_2$, $CaCl_2$, KCl, $NaHCO_3$ and NaBr are released and precipitate out and combine with the anode or cathode structures, but, due to the very small quantity of each, they have no effect on the electrolysis function for any feasible length of time.

As the $H_2$ and O gases are generated they displace an equal volume of sea water in the hemispherical top of chamber 40. When the sea water level receeds from the lower electrode of the control electrodes 80, the effect is the same as opening an electrical switch. This electrode switch was previously closed by the conductivity of sea water and caused the base 76 of PNP type transistor 74, to be at essentially the same potential as the emitter 75. In this condition a PNP transistor is said to be "reverse biased" and the series circuit formed by the collector 77 and the emitter 75, presents a very high resistance to the flow of current from the battery 73, through the primary 92 of the voltage step-up transformer 94. But when the sea water recedes from the control electrodes 80 and the level indicated by 81 in FIGURE 1, there is no longer a "reverse bias." At this time the base 76 is connected to the negative side of battery 73 by a resistor 78. This resistor serves two functions, it limits the current flow when the control electrodes are shorted by sea water and it also limits the base current flow to a safe value when the control electrodes are "open" preventing excessive collector current flow which would damage the transistor. Little base current flows due to the value of the battery voltage and the resistance of 78 but the effect is to "forward bias" the PNP transistor 74, with the result that the collector 77, and emitter 75 circuit becomes a very low resistance to the flow of current. There is then a sudden flow of current through the primary of transformer 94 with the result that a magnetic field is rapidly built up in the core linking the primary 92 and secondary winding 96, and a high voltage is induced in the secondary 96 which causes a spark discharge between its terminals that are a pair of electrodes 98, at the top of the chamber 40. The result is a violent explosion of the developed hydrogen-oxygen gas which again reduce to water the hot gas volume resulting from the explosion caused a great deal of turbulence and momentarily expelled all water from chamber 40 with the result that as the explosion or combustion of H and O is complete, a new supply of sea water rushes in to refill chamber 40 and the process is repeated cyclically as long as the battery 73 has sufficient energy to maintain the electrolysis processing cycle. Little energy is consumed by the electronic fusing circuit in comparison to the electrolysis.

Various other modifications of the invention are contemplated within the scope of the appended claims.

What is claimed is:
1. In a device of the character described, a sealed housing containing a first set of electrodes capable to form a current source when immersed into electrolytic water, at least one water soluble seal mounted in the wall of the housing, the housing forming an open cavity, which cavity contains means for electrolytically decomposing the water content in the cavity into an explosive gas mixture and energized by the current source, the cavity containing a second set of electrodes mounted therein and connected to form an electrical circuit with the current source, and means within the cavity for igniting the gas mixture produced therein.

2. In a device of the character described, a sealed housing containing a first set of electrodes capable to form a current source when immersed into water, at least one water soluble seal mounted in the wall of the housing, the housing forming an open cavity, which cavity contains means for electrolytically decomposing the water content in the cavity into an explosive gas mixture and energized by the current source, the cavity containing a second set of electrodes mounted therein and connected to form an electrical circuit with the current source and a spark gap mounted in the cavity and connected in the electrical circuit.

3. In a device of the character described, a sealed housing containing a first set of electrodes capable to form a current source when immersed into electrolytic water, at least one water soluble seal mounted in the wall of the housing, the housing forming an open cavity, which cavity contains means for electrolytically decomposing the water content in the cavity into an explosive gas mixture and energized by the current source, the cavity containing a second set of electrodes mounted therein and connected to form an electrical circuit with the current source, a pair of spaced contact elements and a spark gap mounted in the cavity, the contact elements connected into the electrical circuit and means for producing an electrical spark across the gap when the produced gas in the cavity reaches a predetermined volume.

4. In a device of the character described, a sealed housing containing a first set of electrodes capable to form a current source when immersed into electrolytic water, at least one water soluble seal mounted in the wall of the housing, the housing forming an open cavity, which cavity contains means for electrolytically decomposing the water content in the cavity into an explosive gas mixture and energized by the current source, the cavity containing a second set of electrodes mounted therein and connected to form an electrical circuit with the current source, a pair of spaced contact elements and a spark gap mounted in the cavity, the contact elements being connected into the electrical circuit, the circuit including at least one capacitor and the primary winding of a transformer, the secondary winding of the transformer being connected to the spark gap.

References Cited in the file of this patent

UNITED STATES PATENTS

| | | |
|---|---|---|
| 248,565 | Edison | Oct. 18, 1881 |
| 1,152,697 | Bodde | Sept. 7, 1915 |
| 1,310,568 | Heap et al. | July 22, 1919 |
| 1,789,158 | Rudolph et al. | Jan. 13, 1931 |
| 2,167,536 | Suits | July 25, 1939 |
| 2,459,267 | Dwyer et al. | Jan. 18, 1949 |
| 2,679,205 | Piety | May 25, 1954 |
| 2,757,475 | Pankove | Aug. 7, 1956 |
| 2,784,559 | Kajmo | Mar. 12, 1957 |
| 3,022,852 | Pavey | Feb. 27, 1962 |

FOREIGN PATENTS

| | | |
|---|---|---|
| 30,253 of 1897 | Great Britain | Dec. 21, 1898 |